United States Patent
Körting et al.

(10) Patent No.: US 6,644,859 B2
(45) Date of Patent: Nov. 11, 2003

(54) SUPPORTING ROLLER SET FOR TILTABLE SUPPORT OF A ROTARY DRUM

(75) Inventors: Reinhard Körting, Ennigerloh (DE); Johannes Auf dem Venne, Ennigerloh (DE); Bernhard Peterwerth, Bad Laer (DE); Gerhard Kästingschäfer, Wadersloh (DE)

(73) Assignee: Krupp Polysius AG, Beckum (DE)

( * ) Notice: Subject to any disclaimer, the term of this patent is extended or adjusted under 35 U.S.C. 154(b) by 0 days.

(21) Appl. No.: 10/031,624

(22) PCT Filed: May 21, 2001

(86) PCT No.: PCT/EP01/05824

§ 371 (c)(1),
(2), (4) Date: Jan. 16, 2002

(87) PCT Pub. No.: WO01/90589

PCT Pub. Date: Nov. 29, 2001

(65) Prior Publication Data

US 2003/0048968 A1 Mar. 13, 2003

(30) Foreign Application Priority Data

May 22, 2000 (DE) .......................................... 100 25 245

(51) Int. Cl.⁷ ............................................... F16C 19/00
(52) U.S. Cl. ..................................................... 384/549
(58) Field of Search ................................ 384/549, 583, 384/558, 569, 584

(56) References Cited

U.S. PATENT DOCUMENTS 5,462,370 A 10/1995 Kastingschafer et al.

FOREIGN PATENT DOCUMENTS

| DE | 567 736 C | 12/1932 |
| DE | 858 340 C | 3/1952 |
| EP | 0 019 136 A | 11/1980 |
| EP | 0567 777 A1 | 11/1993 |

*Primary Examiner*—Lenard A. Footland
(74) *Attorney, Agent, or Firm*—Muramatsu & Associates

(57) ABSTRACT

The invention relates to a supporting roller set for tiltable, axially movable and rotatable support for a rotary drum which can be driven in rotation. It comprises two supporting rollers which lie symmetrically on both sides of a vertical longitudinal central plane of the rotary drum and are each mounted in two rotary bearings which are fixed on bedplate which is tiltably supported on a static foundation. In order to be able to achieve an optimal self-adjustment with easy action of each supporting roller, each bedplate is supported by way of two articulated bearings disposed at a transverse spacing from one another on the foundation, of which the inner articulated bearing is constructed in the form of a ball-and-socket bearing, whilst the outer articulated bearing forms a movable bearing and is supported on the foundation so as to be slidably movable about the central point of the ball of the inner articulated bearing.

20 Claims, 5 Drawing Sheets

SUPPORTING ROLLER SET FOR TILTABLE SUPPORT OF A ROTARY DRUM

The invention relates to a supporting roller set for tiltable, axially movable and rotatable support for a rotary drum which can be driven in rotation, such as a rotary kiln, rotary dryer and the like, according to the preamble to claim 1.

In order that rotary drums with relatively large dimensions, not only with regard to the diameter but also with regard to the length, can be reliably supported or mounted, use is made—as is generally known—of at least two supporting roller sets which are disposed at a corresponding axial distance from one another. In the case of such rotary drums with large dimensions, such as for example rotary kilns, rotary dryers and the like, it is not possible to avoid the occurrence, on the one hand, of certain inaccuracies of assembly and, on the other hand, of more or less great deformations and distortions of the appertaining drum shell, which manifest themselves particularly severely in the case of rotary drums with a strong heat effect, as in the case of rotary kilns. In practical operation this leads to wobbling movements in the region of the running surfaces which support such a rotary drum on the corresponding supporting rollers and are formed by riding rings mounted on the corresponding sections of the drum. In order to be able to compensate for impaired supporting action due to such wobbling movements of the rotary drum running surfaces and to reduce the resulting abrasion (wear) and damage to the circumferential surfaces or running surfaces which are in engagement with one another, numerous embodiments of supporting roller sets are already known in which the supporting rollers and/or the bedplates bearing them are supported so as to be tiltable or axially movable relative to a stationary In this case it should basically be noted that the irregular supporting action in the contact surface between two touching cylinders, which has already been addressed above, can be caused by a so-called "skewing" and/or by a so-called "edge support". "Skewing" is understood to mean the situation where the parallel central axes of two touching cylinders are twisted relative to one another about their common connecting normal, so that the twisted central axis have no common point of intersection. In such skewing an irregular pressure distribution occurs in the contact surfaces with the maximum in the middle of the contact surfaces (viewed over the length of the cylinder), and additionally in the rolling operation between the circumferential surfaces of the cylinders (e.g. between the riding ring of a rotary drum and a supporting roller) the skewing produces axial forces, i.e. forces in the direction of the cylinder axes, in the contact surfaces when corresponding opposing forces (e.g. a so-called "slope take-off force" of a rotary kiln which acts axially) are present. "Edge support" is understood to mean the situation where the parallel central axes of two touching cylinders are twisted relative to one another in their common plane, so that the twisted central axes have a common point of intersections. In this edge support the so-called "Hertzian pressure" is distributed irregularly over the contact surfaces on the length of the cylinders, i.e. the resulting pressure from the integration of the surface pressure (Hertzian pressure) acts unilaterally radially on the touching cylinders.

In practice attempts are made to prevent the skewing and edge support by the use of self-adjusting supporting rollers or supporting roller systems and thus to achieve a favourable contact pattern (constant Hertzian pressure) between the rotary drum running surfaces and the outer circumferential surfaces of the supporting rollers as far as possible in all operating conditions. In order to be able to follow all possible movements (wobbling etc.) of the running surfaces, the bedplate of a supporting roller would for example have to be mounted so that it has at least two degrees of freedom in rotation about the theoretical axes of the skewing and of the edge support. A spherical bearing would of course meet this requirement. However, in such a bearing an unstable mechanical system is produced, i.e. the supporting roller can move in an uncontrolled manner relative to the rotary drum running surface. The critical degree of freedom of this self-adjustment is the rotation about the theoretical axis of rotation of the skewing, the skewing of the supporting roller being caused by eccentric circumferential forces (tractive forces in the case of non-driven supporting rollers and driving forces in the case of driven supporting rollers). As the rotation or skewing increases no restoring forces are produced on the supporting roller, so that the supporting roller goes out of control. Such a system is not capable of functioning.

In order to avoid the described instability, it is known in the art to mount the bedplate of a self-adjusting supporting roller so that no uncontrollable skewing can occur, i.e. of the two necessary degrees of freedom of the self-adjusting bearing of the bedplate the degree of freedom of the skewing is dispensed with. The remaining degree of freedom prevents the edge support between the rotary drum running surface and the supporting roller. The bedplate thus mounted with the firmly connected supporting roller follows the rotary drum running surface (riding ring) through tilting movements only in one direction and thus prevents the said edge support. The position of the theoretical axis of rotation about which the tilting movements take place plays a significant role in the susceptibility of the self-adjustment to axial forces on the part of the rotary drums.

In a construction which is known from EP-A-0 109 136 and corresponds approximately to the supporting roller set, the supporting roller is supported on its axle via two rotary bearings by the two ends of a tiltable bedplate. This bedplate is mounted by means of a central self-orienting roller bearing essentially in the form of a circular cylindrical part which is in movable contact with the inner face of a bearing shell in the form of an annular cylinder segment, the outer face of which is supported on a horizontal foundation plate. The self-orienting bearing in the form of a circular cylindrical part and the bearing shell or the cylinder segment form as an entity the actual self-orienting bearing for the bedplate. Since the inner face of the cylinder segment is equipped with a sliding surface the self-orienting bearing supporting the bedplate can move along the inner sliding surface of the cylinder segment, and during this movement the cylinder segment carries out a pendulum movement on the foundation. In order that the bedplate and the supporting roller borne by it can carry out an axial displacement corresponding to the axial movement of the rotary drum riding ring, mechanical or hydraulic drive means are provided which can be correspondingly actuated by the riding ring. The two supporting rollers of a supporting roller set can be borne by a common bedplate, a separate self-orienting bearing being disposed below each roller; however, it is also possible to support each of the supporting rollers on a separate bedplate and then to connect the two bedplates to one another by way of clamping cables or clamping rods to absorb expansion forces.

If in the known construction last described (EP-A-0 019 136) the skewing explained above is to be adjusted, then this is obviously only possible by a displacement on the bedplate of the rotary bearing supporting the supporting roller axle. Such a displacement of the rotary bearing of the supporting roller axle on the bedplate requires relatively high construction costs and is only possible with special heavy tools and with a relatively high consumption of time. If in this known construction two separate bedplates are provided for the two supporting rollers, then the clamping rods or the like must be constructed so as to absorb relatively high expansion forces and torsional forces.

The object of the invention is to create a supporting roller set which avoids edge support and at least largely avoids skewing and which with relatively simple design and reliable operation ensures an optimal self-adjustment with easy action of each supporting roller.

This object is achieved according to the invention by the features set out.

Advantageous embodiments and variants of the invention are the subject matter of the subordinate claims.

The invention is based upon the knowledge that a self-adjusting supporting roller of a supporting roller set must, in addition to having a stable running, fulfil at least the following requirements:

a) The mounting of the tiltable bedplate must have an easy action so that the supporting roller can follow the wobbling deflections of the running surface or of the riding ring of the rotary drum to be supported without high adjusting moments, any remaining edge support being determined by necessary adjusting moments of the bedplate mounting b) Each self-adjusting supporting roller should not react to forces in the direction of the supporting roller axis (axial forces), i.e. the axial forces which are always present should not influence the supporting action.

c) Unavoidable self-oscillations (every component has self-oscillations) of the self-adjusting supporting rollers should remain unaffected by forces (or their changes over time) in the contact surface between the rotary drum running surface and the supporting roller, because incitation of self-oscillations by these forces would lead to irregular wear on the outer circumferential surface of the supporting rollers.

Therefore in the supporting roller set according to the invention each bedplate bearing a supporting roller—when viewed transversely with respect to the rotary drum and to the supporting rollers—is supported on the foundation by way of two articulated bearings which are transversely spaced from one another, of which the inner articulated bearing which lies nearer to the vertical longitudinal central axis of the rotary drum is constructed in the form of a ball-and-socket bearing and as a fixed bearing is disposed statically on the foundation, whilst the outer articulated bearing which lies further away from this vertical longitudinal central plane forms a movable bearing and is supported so as to be slidably movable on the foundation approximately in the shape of an arc of a circle about the central point of the ball of the inner ball-and-socket bearing.

This construction according to the invention facilitates optimal easy-action self-adjustment of each bedplate and thus of the supporting roller borne by this bedplate, wherein the supporting rollers and the bedplates bearing them are stabilised by the running surfaces or riding rings of the rotary drum which are supported on the outer circumferential surfaces, but in this case due to their easy-action tiltability (by way of the articulated bearing) and by way of the approximately arcuate slidably movable support on the foundation they create the precondition so that on the one hand an unwanted edge support is avoided and on the other hand any unwanted skewing of each supporting roller can be stopped quickly and with little work involved by a corresponding sliding movement of the outer articulated bearing on the foundation.

In this case it is particularly advantageous if an adjusting device is provided in the region of the outer articulated bearing and acts on the bedplate in such a way that this bedplate is displaceable in the direction of the arcuate slidably movable support of the outer articulated bearing relative to the foundation and thus the supporting roller borne by it is adjustable or readjustable in the sense of a skewing adjustment relative to the rotary drum running surface.

It is also regarded as advantageous if the two articulated bearings of the or of each bedplate are essentially constructed as axial articulated bearings and if in the normal position of supporting roller and bedplate the central axis of the inner articulated bearing is oriented so that it is inclined with respect to the horizontal, this inclination being determined by the direction of action of the resultant forces acting on the appertaining supporting roller, i.e. this inclination or angled position of the inner ball-and-socket bearing results from the vectorial addition of circumferential forces (e.g. bearing frictional forces and driving forces) and bearing forces on the or each supporting roller.

A mere comparison of this previously described construction according to the invention with last-described known construction (EP-A-0 019 136) makes clear on the one hand the extremely simple and quick possibility for adjustment in the case of skewing of the or each supporting roller, i.e. skewing caused for example by axial forces on the part of the rotary drum can be eliminated in an extremely simple manner and with little consumption of time and energy. On the other hand—in contrast to the said known construction—due to the design according to the invention expansion forces are absorbed by the inner ball-and-socket bearing which is constructed as a fixed bearing, so that no special elements are necessary for absorption of torsional forces.

In so afar as the adjusting device for adjustment of the skewing of the supporting roller is concerned, this can be constructed in a particularly advantageous and simple manner in that it comprises two adjusting screws which lie axially spaced opposite one another, are movable relative to one another and act substantially horizontally, as well as a stop element, the lateral faces of which form stop or contact surfaces for the ends of these screws. Thus the skewing adjustment or the adjustment of each bedplate and of the supporting roller borne by it relative to the rotary drum running surface can be carried out in an extremely simple manner using a very simple hand tool, for example a spanner, and also quickly and with little force.

The invention will be explained in greater detail below with reference to the drawings, in which.

Figure 1:
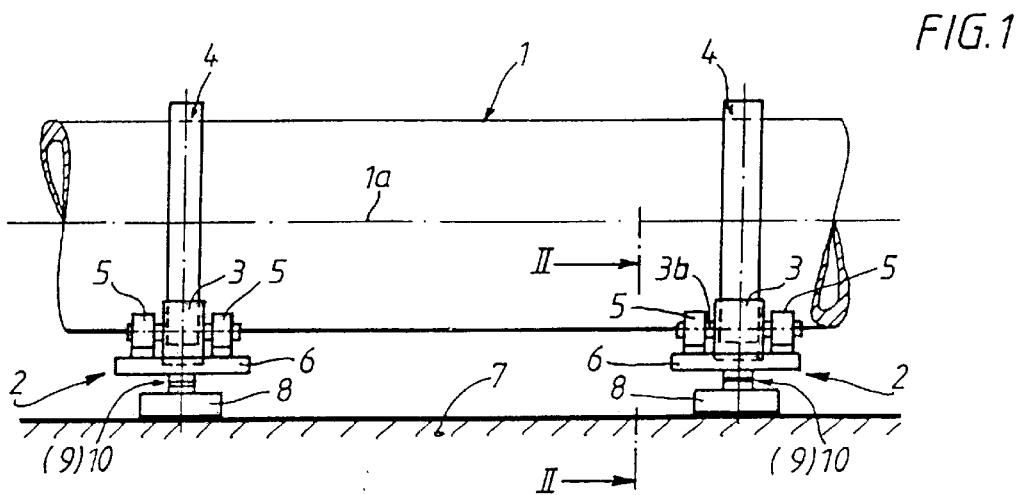
FIG. 1 shows a longitudinal view, which has been kept quite schematic, of a longitudinal section of a rotary drum which is rotatably supported for example on two supporting roller sets constructed according to the invention.

First of all, the longitudinal view according to FIG. 1 shows quite generally how a rotary drum or a corresponding longitudinal section of a rotary drum 1 is rotatably supported on for example two supporting roller sets 2 constructed according to the invention. It may be assumed for example that this rotary drum 1 is a rotary kiln (with correspondingly large dimensions in terms of diameter and length) which can be driven in rotation about its longitudinal axis 1a in a manner which is known per se and is therefore not illustrated in greater detail. Each supporting roller set 2 can be constructed in substantially the same way, so that in the following description only one of them needs to be explained in detail.

Figure 2:
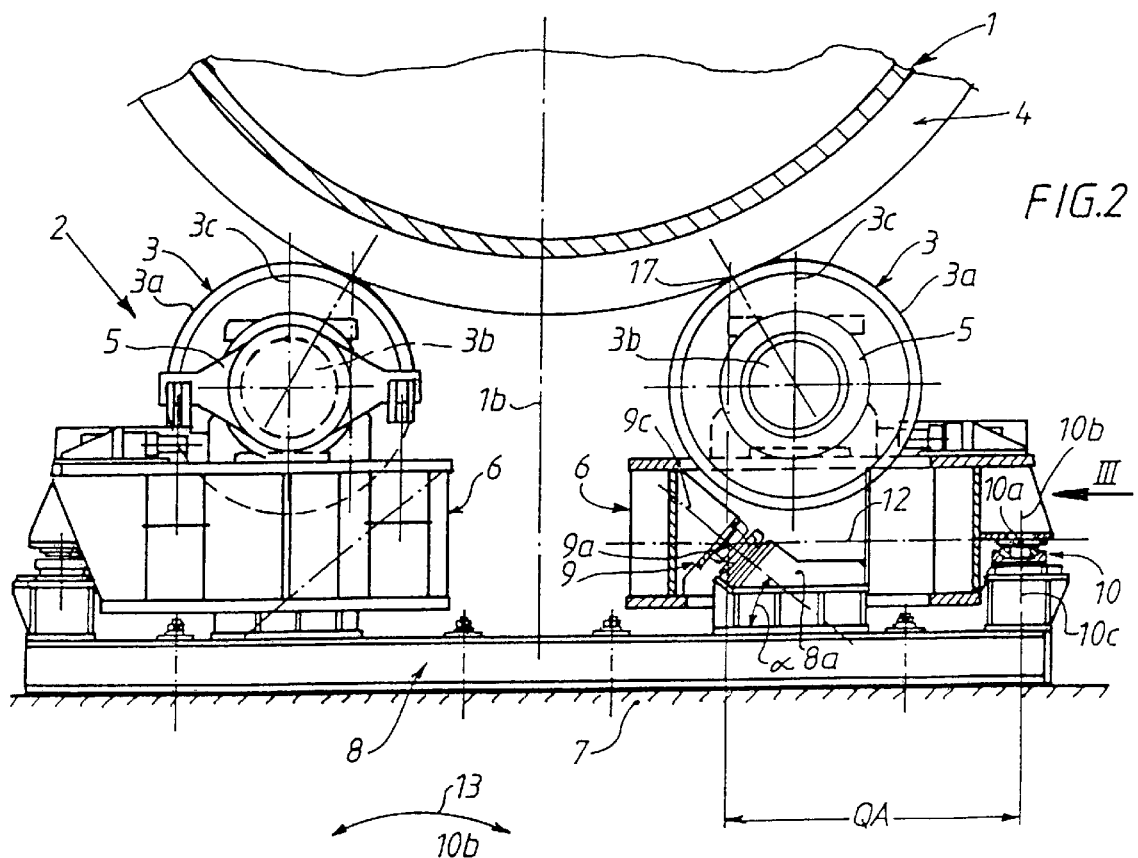
FIG. 2 shows a transverse or end view of a supporting roller set according to invention, on an enlarged scale and in section approximately in the right-hand half, approximately corresponding to the section line II—II in FIG. 1.

An additional look at the transverse or end view according to FIG. 2 makes it clear that the (each) supporting roller set 2 contains two supporting rollers 3 which lie in pairs symmetrically on both sides of a vertical longitudinal plane 1b of the rotary drum 1 which extends through the longitudinal axis 1a, a corresponding running surface of the rotary drum 1 being rotatably supported on the outer circumferential surface or running surface 3a of each of the said rollers, and this rotary drum running surface is generally formed by a correspondingly reinforced shell portion of the rotary drum 1, but preferably—as in this example—a respective riding ring 4 (or the outer circumferential surface or running surface thereof) mounted in a manner which is known per se on the outer circumference of the rotary drum 1. The widths of the supporting rollers 3 extending in the axial direction and of the riding rings 4 are adapted to one another in the usual way. Each supporting roller 3 is freely rotatably mounted by way of its supporting roller axle 3b in two rotary bearings (usual plain bearings or self-orienting roller bearings). This mounting of the supporting roller axles 3b in the rotary bearings 5 can advantageously be floating in a manner which is known per se, so that the supporting roller 3 which is non-rotatably borne by the supporting roller axle 3b can to a limited extent follow axial movements of the rotary drum 1 and riding rings 4 which occur during operation; this limited—floating axial movability of the supporting rollers 3 and supporting roller axles 3b can be used in the usual way—for example by means of thrust washers—for visual checking, so that in the event of axial forces occurring and causing skewing a corresponding adjusting device can be actuated for elimination of the skewing, and this will be discussed in greater detail below.

Each supporting roller axle 3b and the appertaining supporting roller 3 is fixed by way of its two rotary bearings 5 on a bedplate 6 which in turn is tiltably supported on a static foundation or foundation base 7. In the illustrated embodiment each supporting roller 3 of a supporting roller set 2 is disposed on a separate bedplate 6, the two bedplates 6 of the supporting roller set 2 being supported on a common base frame (or a common base plate 8) which in turn is statically disposed on the actual foundation 7, i.e. the common base frame 8 forms a or the part of a static foundation on which the bedplates 6 are directly supported, although the foundation base 7 may also be constructed so that the bedplates 6 could be directly be supported thereon.

Figure 4:
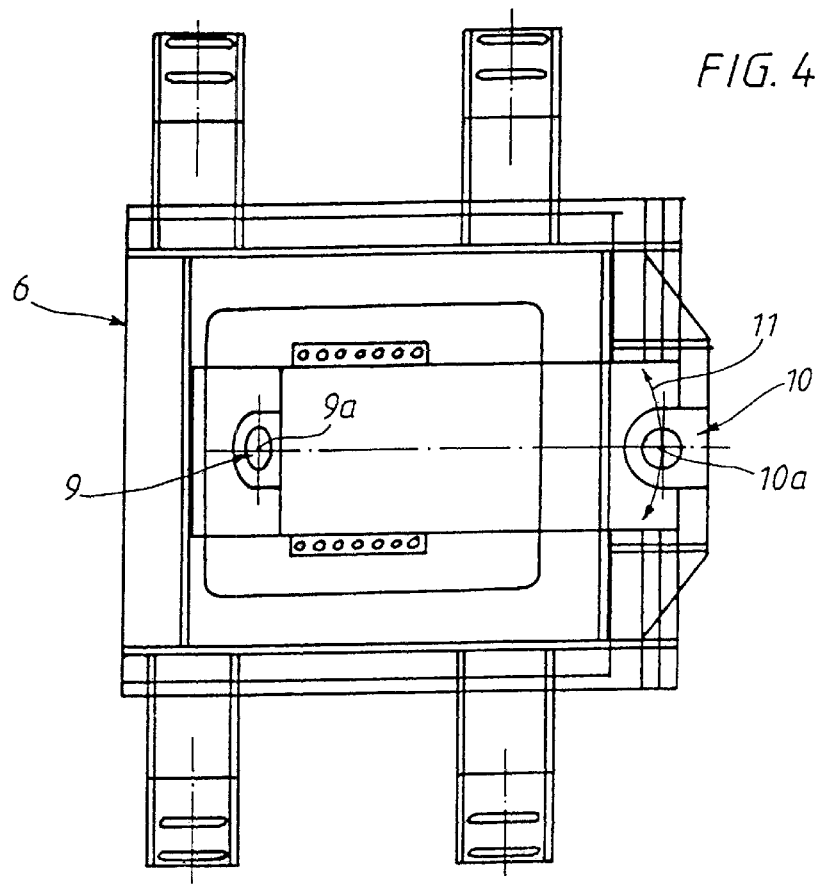
FIG. 4 shows a plan view of a bedplate of the supporting roller set.

A significant idea concerning this (each) supporting roller set 2 is to be seen in the fact that each bedplate 6 (and thus also the supporting roller 3 borne by it)—when viewed transversely with respect to the rotary drum 1 and to the supporting rollers 3, that is to say corresponding to the view according to FIG. 2—is supported on the base frame 8 (and thus also on the static foundation 7) by way of two articulated bearings 9, 10 which are disposed at a corresponding axial spacing QA from one another and which in the illustration according to FIG. 2 are to be seen only in the region below the right-hand bedplate 6 (as this is a partial sectional view), whilst in the left-hand half of FIG. 2 they are hidden (as this purely an end view). Of these articulated bearings 9, 10, the articulated bearing 9 which lies closer to the vertical longitudinal central axis 1b of the rotary drum 1 is constructed in the form of a ball-and-socket bearing and in this case is disposed as a fixed bearing statically on the base frame 8 (but also directly on the foundation base 7 if need be). By contrast, the outer articulated bearing 10 which lies further away from this vertical longitudinal central plane 1b forms a movable bearing, and in this case this outer articulated bearing 10 is supported on the base frame 8 so as to be slidably movable on the foundation approximately in the shape of an arc of a circle about the central point 9a of the inner ball-and-socket bearing 9, as is indicated by the arcuate double arrow 11 in the plan view according to FIG. 4 of the bedplate 6.

In the right-hand half in FIG. 2 it can also be seen that a straight line 12 connecting the points of articulation 9a, 10a of the inner articulated bearing 9 and of the outer articulated bearing 10 forms a transversely extending geometric pivot axis which in turn forms a common axis of tilt for these two articulated bearings 9, 10 and preferably extends substantially approximately horizontally. In this case the appertaining supporting roller together with the bedplate 6 which bears it is then accordingly supported so that it is tiltable about this axis of tilt 12, i.e. according to FIG. 2, right-hand half, perpendicular to the drawing plane and according to FIG. 3 in the direction of the double arrow 13.

An adjusting device 14 is also of particular importance which is provided in the region of the outer articulated bearing 10 (cf FIGS. 3 and 5) and acts on the or each bedplate 6 in such a way that this bedplate 6 can be displaced in the direction of the aforementioned arcuate slidably movable support (double arrow 11) of the outer articulated bearing 10 relative to the static foundation 7 or the base frame 8, as a result of which the supporting roller 3 borne by it can be precisely adjusted in the sense of a skewing adjustment relative to the running surface or to the riding ring 4 of the rotary drum 1.

Figure 5:
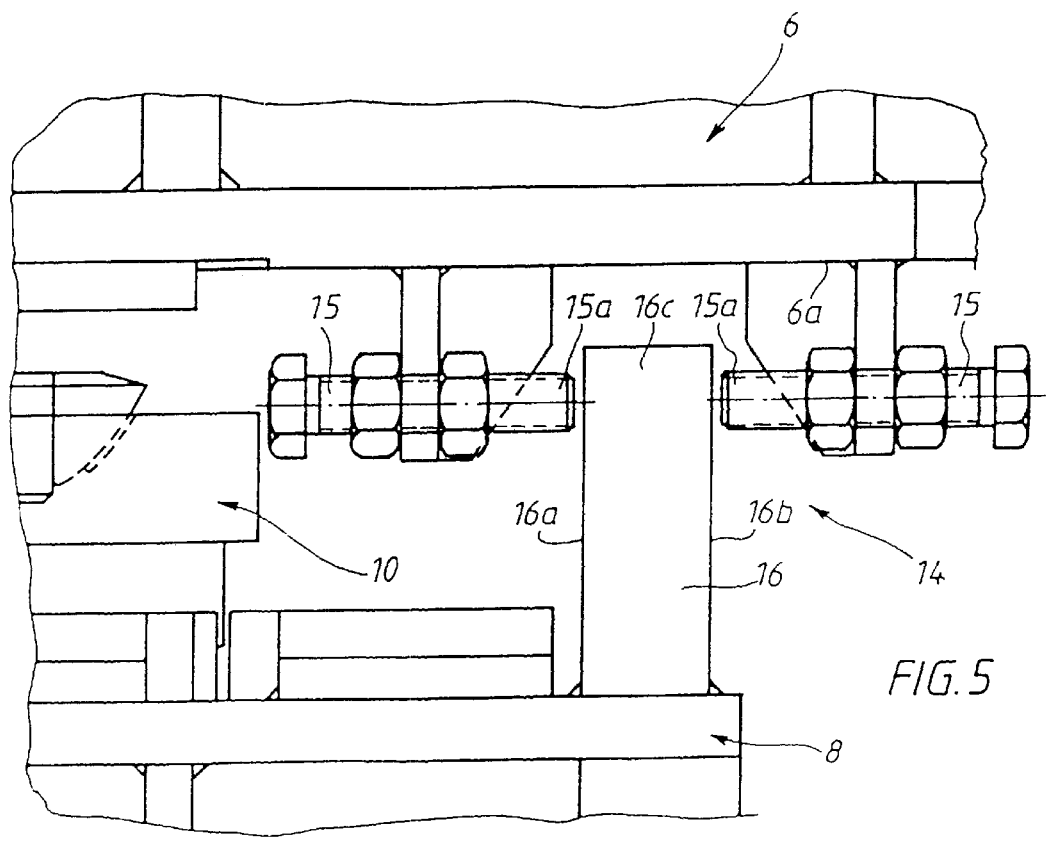
FIG. 5 shows an enlarged detail approximately corresponding to the portion V in FIG. 3 in order to explain an adjusting device for the bedplate.

As can be seen in the enlarged detail view according to FIG. 5, for skewing adjustment of the supporting roller 3 (by way of the appertaining bedplate 6) the adjusting device 14 comprises two adjusting screws 15 which lie axially spaced opposite one another, are movable relative to one another and act substantially horizontally, as well as a stop element 16 which is disposed between the opposing ends 15a of these adjusting screws, the lateral faces 16a, 16b of the stop element forming stop or contact surfaces for the ends 15a of these screws. In this case it is regarded as advantageous if the two adjusting screws 15 are fixed (for example welded) on the underside 6a of the bedplate 6 approximately in the region of the outer articulated bearing 10, whilst the stop element 16 is firmly mounted in an approximately upright position on the base frame (as shown in FIG. 5) and in this case extends freely with its upper end 16c sufficiently far into the region between the two ends of the adjusting screws 15a, whilst still maintaining sufficient spacing from the underside 6a of the bedplate, so that during the tilting movement of the bedplate 6 it cannot come into contact with this underside 6a.

Whilst the inner articulated bearing 9 of each bedplate 6 is always—as mentioned—constructed in the form of a ball-and-socket bearing, the outer articulated bearing 10 can generally be constructed in any suitable manner which allows a pivotability in a pivot plane 10b lying parallel to the vertical longitudinal central plane 3c of the supporting roller 3 For this purpose the outer articulated bearing 10 could be construction approximately in the form of a simple hinge bearing (pivot hinge bearing). However, in the present embodiment it is preferred that the outer articulated bearing 10 of the/each bedplate 6 should be constructed in the form of a ball-and-socket bearing (substantially the same as the inner articulated bearing 9).

In so far as the construction and arrangement of the two articulated bearings 9, 10 in the region between the appertaining bedplate 6 and base frame 8 is concerned, both articulated bearings 9, 10 of each bedplate 6 are constructed on the one hand as ball-and-socket bearings (as mentioned) and on the other hand essentially as axial articulated bearings. The latter is possible due to the fact that in the starting or normal position—substantially shown in the drawings—of the supporting roller 3 and bedplate 6 the central axis 10c of the outer articulated bearing 10 which passes through the central point 10a of the ball is oriented substantially vertically (cf in particular FIGS. 3 and 7). By contrast, the central axis 9c of the inner articulated bearing 9 is oriented at an inclination $\alpha$ with respect to the horizontal H, as can be seen from FIGS. 3 and 6. This angled position or inclination $\alpha$ is determined by the direction of action of the resultant forces acting on the appertaining supporting roller 3, i.e. from the vectorial addition (e.g. bearing frictional forces and optionally driving forces) as well as bearing forces. This makes possible the construction of the two articulated bearings 9, 10 of each bedplate 6 as axial articulated bearings, which brings with it a particularly simple and therefore inexpensive design of these articulated bearings 9, 10, which becomes particularly clear when one considers that with another orientation and arrangement these articulated bearings would also have to absorb additional radial loads, which would involve a correspondingly more expensive articulated bearing design. It should be mentioned, however, that the use of articulated bearings which can be loaded axially and radially is not fundamentally excluded in this design according to the invention.

Figure 3:
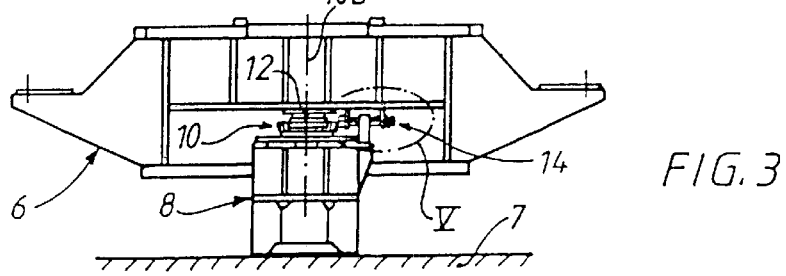
FIG. 3 shows a side view (approximately corresponding to the arrow III in FIG. 2) of a bedplate of the supporting roller set supported by way of a articulated bearings on a foundation.

It can also be seen in FIG. 3 that the central point 9a of the inner ball-and-socket bearing 9 is disposed vertically below the contact line 17 between the outer circumferential surface—running surface 3a of the supporting roller 3 and the running surface/riding ring 4 of the rotary drum 1. This has the advantage that axial forces on the supporting roller 3 (and correspondingly also on the bedplate 6) caused by an axial movement of the rotary drum 1 cannot exert any influence on the adjusting means 14 for the skewing of the supporting roller 3.

Figure 6:
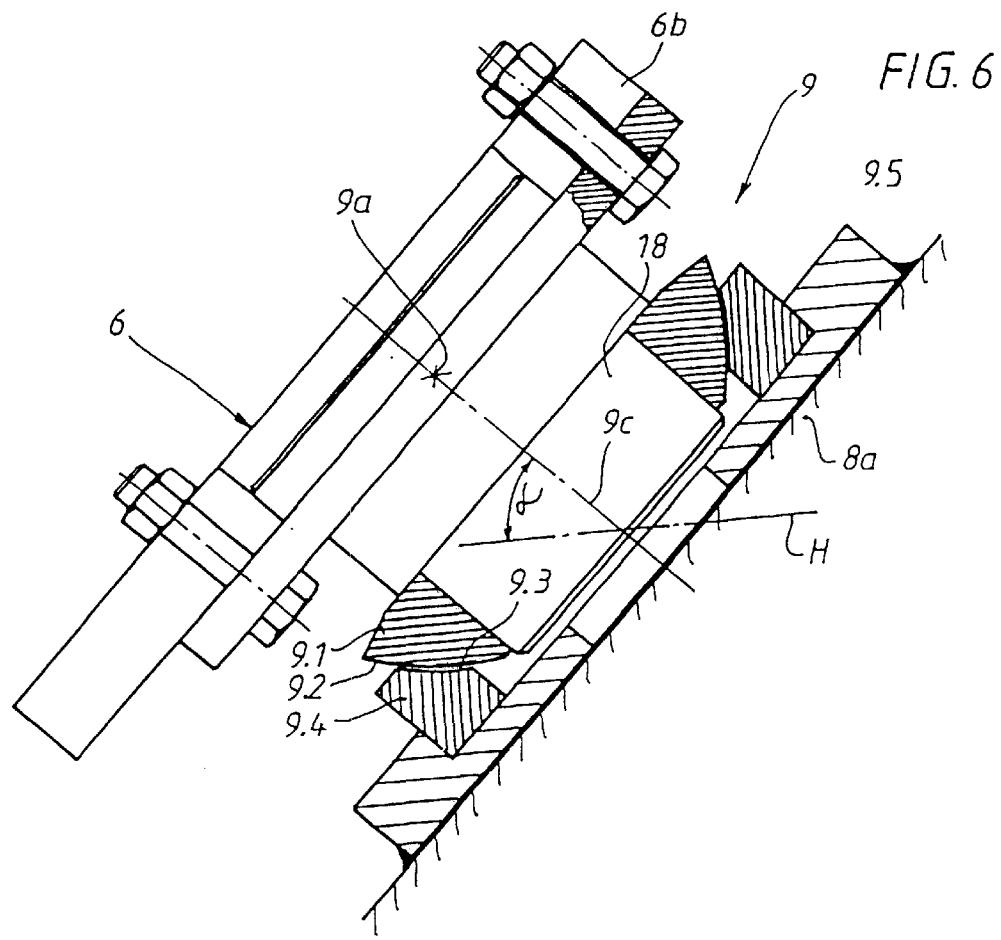
FIG. 6 shows a vertical sectional view through an inner ball-and-socket bearing of the bedplate.
Figure 7:
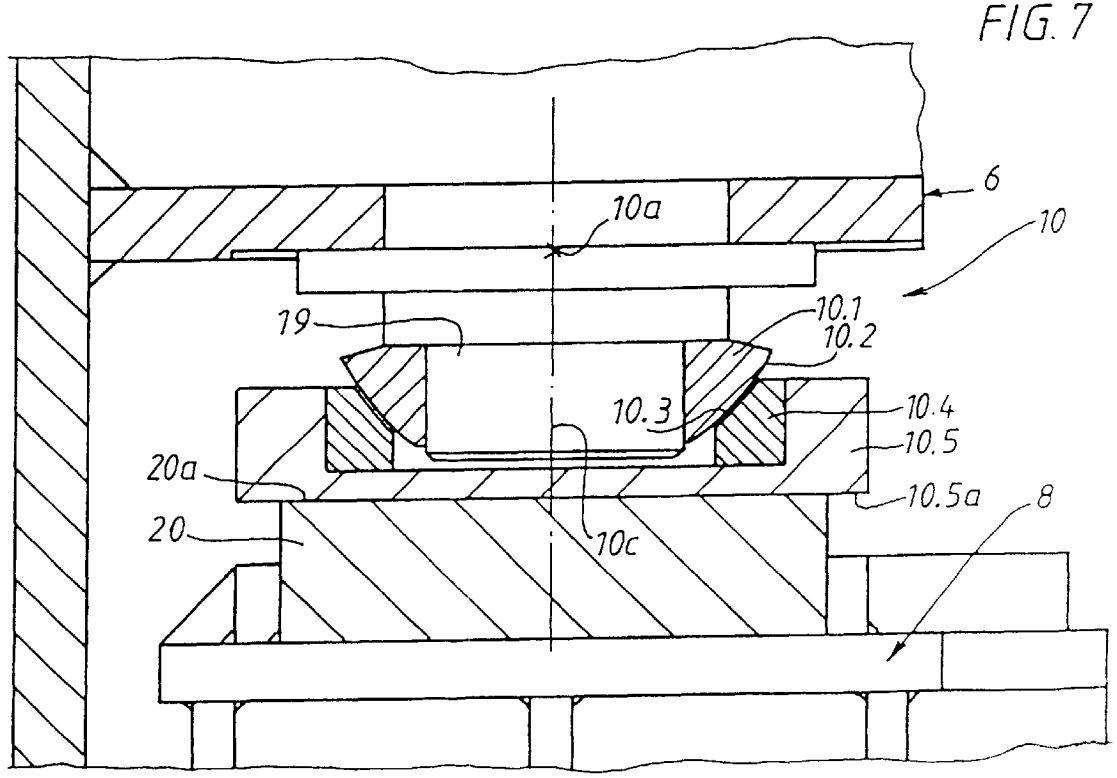
FIG. 7 shows a vertical sectional view through an outer ball-and-socket joint of the bedplate.

The design of the two ball-and-socket bearings 9 and 10 is shown in greater detail in FIGS. 6 and 7. First of all it can be generally seen here that both ball-and socket bearings 9, 10 are of substantially the same construction. Accordingly each ball-and-socket bearing 9, 10 is preferably constructed in the form of a spherical segment bearing.

Considering first of all the design of the inner ball-and-socket bearing 9 according to FIG. 6, then this ball-and-socket bearing (spherical segment bearing 9) has a first spherical segment part 9.1 which with a convex outer plain bearing surface 9.2 in the shape of a spherical segment is mounted so as to be capable of universal swivelling movement in a concave inner plain bearing surface 9.3., which is in the shape of a spherical segment and like a joint seat, of a second spherical segment part 9.4. These two spherical segment parts 9.1 and 9.4 are of approximately circular construction—as FIG. 6 shows clearly—and the first spherical segment part 9.1 is firmly mounted on a type of axle journal 18 which is in turn fixed on a projection 6b of the bedplate 6 which is oriented correspondingly obliquely downwards. The second spherical segment part 9.4 on the other hand is mounted or supported statically—for example by way of a connecting part 9.5—on a fixing projection 8a of the base frame which is oriented correspondingly obliquely upwards.

Also the outer ball-and-socket bearing (spherical segment bearing) 10 has a first spherical segment part 10.1 which with a convex outer plain bearing surface 10.2 in the shape of a spherical segment is mounted so as to be capable of universal swivelling movement in a concave inner plain bearing surface 10.3, which is in the shape of a spherical segment and like a joint seat, of a second spherical segment part 10.4. Also in this outer ball-and-socket bearing (spherical segment bearing) 10 the two spherical segment parts 10.1 and 10.4 are of circular construction—as can be seen from FIG. 7 However, the second spherical segment part 10.4 of this outer ball-and socket bearing 10 is supported on the base frame 8 not so as to be fixed (as in the case of the inner ball-and-socket bearing 9) but so as to be slidably movable in the direction of the double arrow 11 (FIG. 4) This slidably movable support could take place in the simplest form in that connecting part 10.5 which firmly receives the spherical segment part 10.4 is supported with its underside 10.5a directly on a corresponding opposing surface constructed as a sliding abutment on the upper face of the base frame 8. However, according to the embodiment illustrated in FIG. 7 it is preferred that in the region below the connecting part 10.5 a planar approximately plate-like sliding abutment 20 is fixed—optionally replaceably—separately on the upper face of the base frame 8, and the underside 10.5a of the connecting part 10.5 likewise constructed as a sliding surface and thus the lower second spherical segment part 10.4 is supported so as to be slidably movable on the upper face 20a, constructed as a sliding surface, of the sliding abutment. Thus each sliding abutment 20 is constructed in the form of a substantially flat plain bearing plate. This sliding abutment or this plain bearing plate 20 is advantageously produced from a sliding material with relatively low coefficients of friction, e.g. from grey-cast iron or corresponding plastic material.

In the previously described supporting roller set 2 according to the invention each supporting roller 3 is constructed and disposed in an optimal manner so that it is self-adjusting relative to the appertaining riding ring of the rotary drum 1. Since these self-adjusting supporting rollers 3 react negatively to axial forces, they should not have any skewing. For this reason it is advantageous to be able to check the position of the supporting rollers 3 and their supporting roller axles 3b at least visually—as already mentioned above—so that in the event that skewing of the supporting roller occurs this skewing can be quickly eliminated with the aid of the adjusting device 14 in order to be able to adjust the corresponding supporting roller 3 as far as possible without skewing. In this case repeated adjustment of the skewing may be necessary due to changed operating conditions of the rotary drum 1 and due to other influences. The actuation of the described adjusting device 14 for adjustment of the skewing of the supporting rollers has a relatively easy action and is simple. If the illustration particularly in FIG. 5 is considered again in this respect, then the adjusting screws 15 can be constructed as simple hexagonal screws and can be secured in their adjusted position by corresponding lock nuts (as illustrated). Thus these adjusting screws 15 can be actuated quickly and without special cost with the aid of a suitable spanner.

As is known per se in the art, the supporting rollers 3 of supporting roller sets 2 for rotary drums 1 can be constructed merely as bearing or supporting rollers or also as drivable supporting rollers. Examples of these are explained below with reference to the embodiment according to the invention of a supporting roller set as shown in FIGS. 8, 9 and 10.

From the previous explanations of the construction according to the invention of the or each supporting roller set 2 and also from the corresponding previous figures of the drawings it is already basically apparent that the central axes 9c, 10c (or their corresponding upper central portions) of the upper articulated bearing parts which are tiltable together with the appertaining bedplate 6, that is to say the first spherical segment parts 9.1 and 10.1, of both articulated bearings 9, 10 lie in a common reference plane which extends perpendicular to the bedplate 6 and is oriented at right angles to the vertical longitudinal central plane 3c (FIG. 2) of the appertaining supporting roller 3.

Figure 8:
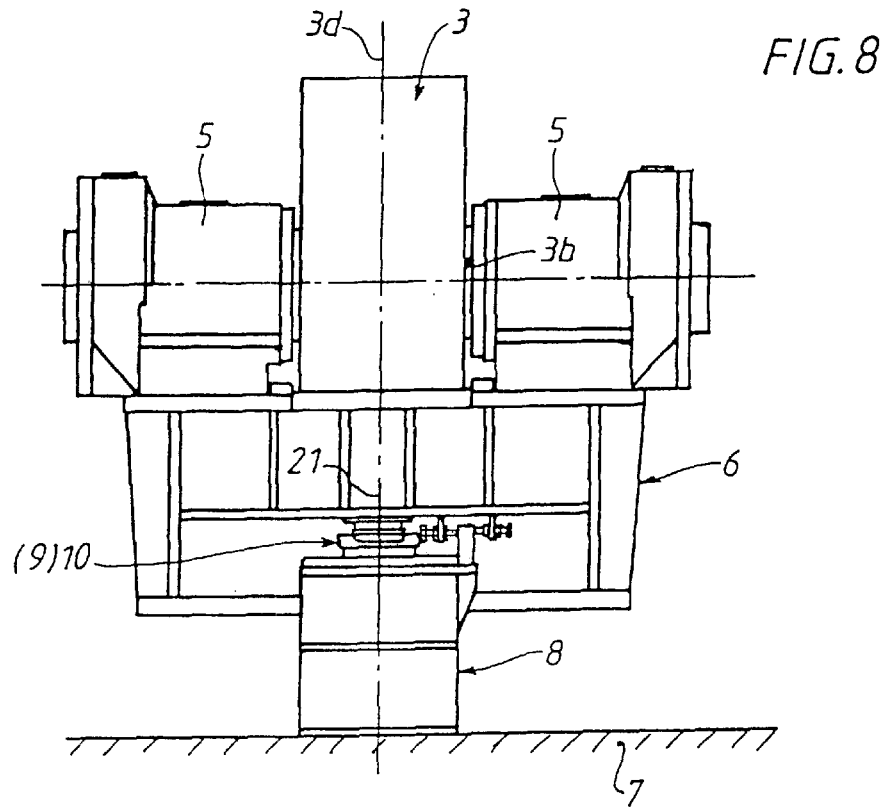
FIGS. 8, 9 and 10 shows approximately similar longitudinal side views of three different embodiments of the supporting roller set according to the invention.

If in this case each supporting roller 3 is constructed corresponding to the representation in FIG. 8 as a mere support bearing roller, then the appertaining supporting roller axle 3b is mounted with its ends in the two rotary bearings 5 which are disposed on both sides of the symmetrical vertical transverse central plane 3d of the supporting roller. In this construction (FIG. 8) of the supporting roller 3 the above-mentioned reference plane 21 for the upper articulated bearing parts 9.1, 10.1 of the articulated bearings 9, 10 coincides with the symmetrical vertical transverse central plane 3d of the supporting roller 3, because the supporting roller 3 with the supporting roller axle 3b, the two rotary bearings 5, the bedplate 6 and the articulated bearings 9, 10 form an equilibrium system with respect to the transverse central plane 3d The embodiment illustrated in FIG. 9 operates in principle in a similar manner, in that a supporting roller 3 is constructed so as to be drivable, and flanged on to the two ends $3b_1$ and $3b_2$ of this supporting roller 3 is a reduction drive motor 22, 23 which is preferably a hydraulic motor in each case but can basically be a corresponding electric motor. The difference between this embodiment according to FIG. 9 and the embodiment according to FIG. 8 merely resides in the fact that a similar drive motor 22, 23 is mounted on both ends of the supporting roller, so that here too an equilibrium system is produced on both sides of the symmetrical vertical transverse central plane 3d of the supporting roller. As a result the reference plane 21 explained above can again coincide with the previously mentioned transverse central plane 3d of the supporting roller 3. Not only in the example according to FIG. 8 but also in the example according to FIG. 9 constructions are therefore produced which are structurally symmetrical and which are easy to manage with regard to torques and tilting moments which occur.

Figure 9:
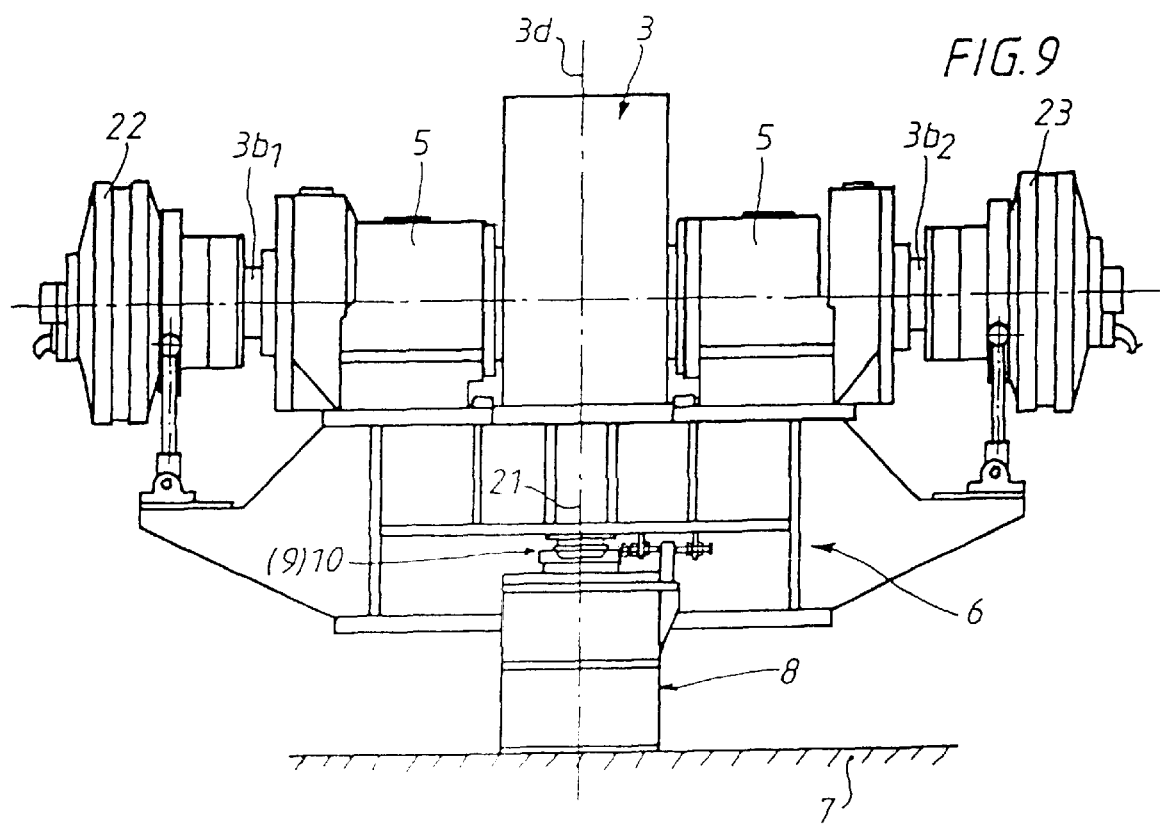
Figure 10:
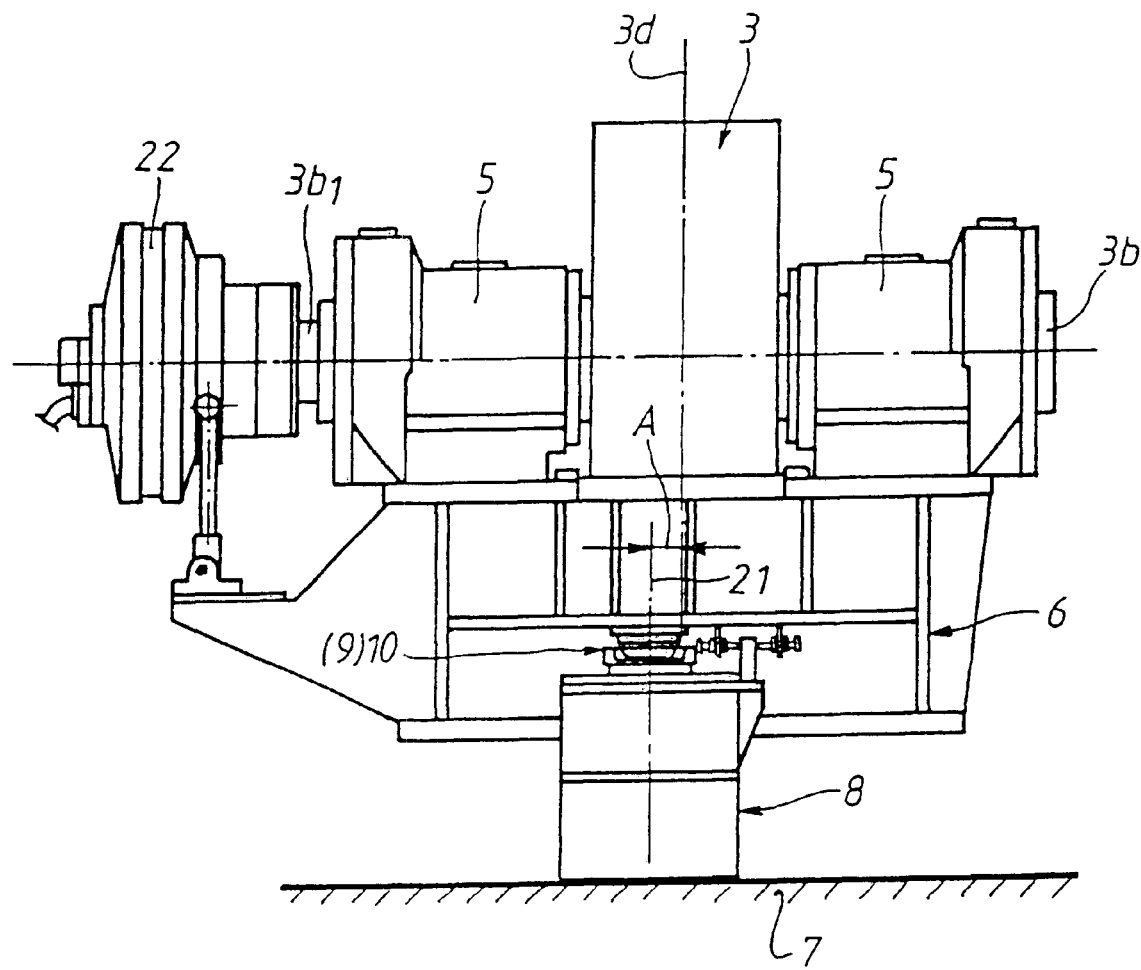

The embodiment according to FIG. 10 differs from those according to FIGS. 8 and 9 in that in an otherwise identical construction a reduction drive motor 22 is flanged on only at one end $3b_1$ of the supporting roller; therefore the supporting roller 3 is likewise constructed so as to be drivable. Since in this embodiment (FIG. 10) to a certain extent a disequilibrium is produced with regard to the symmetrical vertical transverse central plane 3d of the supporting roller 3 due to the unilateral motor drive, a corresponding balancing must be ensured in view of the tiltable support of the bedplate 6 (by way of the articulated bearings 9., 10 on the base frame 8). For this reason in this third embodiment (FIG. 10) the reference plane 21 containing the central axes of the upper articulated bearing parts of both articulated bearings 9, 10 is displaced parallel to the symmetrical vertical transverse central plane 3d of the supporting roller 3 by a balancing distance A.

What is claimed is:

1. Supporting roller set for tiltable, axially movable and rotatable support for a rotary drum (1) which can be driven in rotation, which contains two supporting rollers (3) which lie symmetrically on both sides of a vertical longitudinal central plane (1b) of the rotary drum (1), a running surface (4) of the rotary drum (1) being rotatably supported and on the outer circumferential surfaces (3a) of the said supporting rollers, wherein each of these supporting rollers is freely rotatably mounted by way of its supporting roller axle (3b) in two rotary bearings (5) which are fixed bedplate (6) tiltably supported on a static foundation (7, 8), characterised in that each bedplate (6) bearing a supporting roller (3)—when viewed transversely with respect to the rotary drum (1) and to the supporting rollers (3)—is supported on the foundation (7, 8) by way of two articulated bearings (9, 10) which are transversely spaced (QA) from one another, of which the inner articulated bearing (9) which lies nearer to the vertical longitudinal central axis (1b) of the rotary drum (1) is constructed in the form of a ball-and-socket bearing and as a fixed bearing is supported statically on the foundation (7, 8), whilst the outer articulated bearing (10) which lies further away from this vertical longitudinal central plane (1b) forms a movable bearing and is supported so as to be slidably movable on the foundation (7, 8) approximately in the shape of an arc of a circle about the central point (9) of the ball of the inner ball-and-socket bearing (9).

2. Supporting roller set as claimed in claim 1, characterised in that an adjusting device (14) is provided in the region of the outer articulated bearing (10) and acts on the bedplate (6) in such a way that this bedplate is displaceable in the direction of the arcuate slidably movable support of the outer articulated bearing (10) relative to the foundation (7, 8) and thus the supporting roller (3) borne by it is adjustable in the sense of a skewing adjustment relative to the rotary drum running surface (4).

3. Supporting roller set as claimed in claim 2, characterised in that the adjusting device (14) for adjustment of the skewing of the supporting roller (3) comprises two adjusting screws (15) which lie axially spaced opposite one another, are movable relative to one another and act substantially horizontally, as well as a stop element (16), the lateral faces (16a, 16b) of which form stop surfaces for the ends (15a) of these screws.

4. Supporting roller set as claimed in claim 3, characterised in that the adjusting screws (15) are fixed on the underside (6a) of the bedplate (6) approximately in the region of the outer articulated bearing (10), whilst the stop element (16) is firmly mounted in an approximately upright position on the foundation (7, 8) and protrudes freely with its upper end (16c) into the region between the ends (15a) of the two adjusting screws.

5. Supporting roller set as claimed in claim 1, characterised in that the outer articulated bearing (10) of the bedplate (6) is also constructed in the form of a ball-and-socket bearing.

6. Supporting roller set as claimed in claim 1, characterised in that the outer articulated bearing (10) of the bedplate (6) is constructed approximately in the form of a hinge bearing which is pivotable in a pivot plane (10b) lying parallel to the vertical longitudinal central plane (3c) of the supporting roller (3).

7. Supporting roller set as claimed in claim 1, characterised in that a straight line 1(2) connecting the central points of articulation (9a, 10a) of the inner and outer articulated bearings (9, 10) forms a geometric pivot axis as a common axis of tilt (12) for these articulated bearings, whereby the appertaining supporting roller (3) together with the bedplate (6) which bears it is tiltable about this axis of tilt (12).

8. Supporting roller set as claimed in claim 7, characterised in that the axis of tilt (12) extends substantially horizontally.

9. Supporting roller set as claimed in claim 7, characterised in that each ball-and-socket bearing (9, 10) is constructed in the form of a spherical segment bearing and has a first spherical segment part (9.1, 10.1) which with a convex outer plain bearing surface (9.2, 10.2) in the shape of a spherical segment is mounted so as to be capable of universal swivelling movement in a concave inner plain bearing surface (9.3, 10.3), which is in the shape of a spherical segment and like a joint seat, of a second spherical segment part (9.4, 10.4).

10. Supporting roller set as claimed in claim 9, characterised in that the two spherical segment parts (9.1, 9.4, 10.1, 10.4) of each ball-and-socket bearing (9, 10) are of approximately circular construction, whereby in each case one spherical segment part (9.1, 10.1) is firmly connected to the movable bedplate (6) and second spherical segment part (9.4, 10.4) is supported on the foundation (7, 8).

11. Supporting roller set as claimed in claim 10, characterised in that the second spherical segment part (9.4) of the inner ball-and-socket bearing (9) is firmly connected to the foundation (7, 8), whilst the second spherical segment part (10.4) of the outer ball-and-socket bearing (10) is supported by a sliding surface (10.5a) so as to be slidably movable on a planar sliding abutment (20) firmly connected to the foundation.

12. Supporting roller set as claimed in at least one of claim 1, characterised in that both articulated bearings (9, 10) of the bedplate (6) are constructed substantially as axial articulated bearings and that in the normal position of the supporting roller (3) and bedplate (6) the central axis (10c) of the outer articulated bearing (10) is oriented substantially vertically and the central axis (9c) of the inner articulated bearing (9) is oriented at an inclination ($\alpha$) with respect to the horizontal (H), this inclination ($\alpha$) being determined by the direction of action of the resultant forces acting on the appertaining supporting roller (3).

13. Supporting roller set as claimed in claim 12, characterised in that the central point (9a) of the inner ball-and-socket bearing (9) is disposed vertically below the contact line (17) between the outer circumferential surface (3a) of the supporting roller (3) and the running surface (4) of the rotary drum (1).

14. Supporting roller set as claimed in claim 1, characterised in that the central axes of the upper articulated bearing parts (9.1, 10.1) which are tiltable together with the bedplate (6) of both articulated bearings (9, 10) lie in a common reference plane (21) which extends perpendicular to the bedplate (6) and is oriented at right angles to the vertical longitudinal central plane (3c) of the appertaining supporting roller (3).

15. Supporting roller set as claimed in claim 14, characterised in that in the case of each supporting roller (3) constructed purely as a support bearing roller the reference plane (21) coincides with the symmetrical transverse central plane (3d) of the supporting roller (3).

16. Supporting roller set as claimed in claim 14, characterised in that at least one supporting roller (3) is constructed so as to be drivable, a reduction drive motor (22, 23) is flanged on to the two ends ($3b_1$, $3b_2$) of this supporting roller, and in this case the reference plane (21) is oriented so as to coincide with the symmetrical transverse central plane of the supporting roller.

17. Supporting roller set as claimed in claim 14, characterised in that at least one supporting roller (3) is constructed so as to be drivable and a reduction drive motor (22) is flanged on only at one end ($3b_1$) of the supporting roller axle (3b) and that in this case the reference plane (21) is displaced parallel to the symmetrical vertical transverse central plane (3d) of the supporting roller (3) by a balancing distance (A).

18. Supporting roller set as claimed in claim 1, characterised in that each bedplate (6) is supported directly on a base frame (8) disposed firmly on the actual foundation (7).

19. Supporting roller set as claimed in claim 18, characterised in that the sliding abutments (20) for the outer articulated bearings (10) are firmly mounted on the base frame (8) in the form of substantially flat plain bearing plates which are produced from a sliding material with relatively low coefficients of friction.

20. Supporting roller set as claimed in claim 18, characterised in that each supporting roller (3) of the supporting roller set (2) is disposed on a separate bedplate (6) and both bedplates (6) are supported on a common base frame (8).

* * * * *